(12) United States Patent
Franz et al.

(10) Patent No.: US 6,692,181 B1
(45) Date of Patent: Feb. 17, 2004

(54) LINKING DEVICE FOR COMPONENTS, ESPECIALLY FOR HOUSING PARTS OF CIRCUIT BREAKERS

(75) Inventors: Bernhard Franz, Regensburg (DE); Wolfgang Leitl, Wenzenbach (DE); Josef Schmid, Kallmuenz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/009,756

(22) PCT Filed: Apr. 17, 2000

(86) PCT No.: PCT/DE00/01200

§ 371 (c)(1),
(2), (4) Date: Oct. 29, 2001

(87) PCT Pub. No.: WO00/67276

PCT Pub. Date: Nov. 9, 2000

(30) Foreign Application Priority Data

Apr. 29, 1999 (DE) .......................... 199 19 541

(51) Int. Cl.⁷ .................................................. F16B 7/00
(52) U.S. Cl. ...................... 403/294; 403/292; 403/278; 403/279; 200/50.32; 200/293; 200/303; 200/307
(58) Field of Search ................................ 403/278, 279, 403/281, 282, 286, 289, 290, 292, 294, 374.1; 335/8–10, 202; 200/50.32, 50.33, 50.37, 50.4, 293, 303, 307; 411/350, 553, 550, 549

(56) References Cited

U.S. PATENT DOCUMENTS

| 2,239,125 A | * | 4/1941 | Summers .................... 411/552 |
| 2,839,808 A | * | 6/1958 | Zahodiakin ................. 411/551 |

FOREIGN PATENT DOCUMENTS

| CH | 962 725 | 4/1957 |
| DE | 76 24 442 | 8/1976 |
| DE | 83 22 594.3 | 1/1984 |
| DE | 35 00975 A1 | 7/1986 |
| DE | 44 20 766 A1 | 12/1995 |
| FR | 1 590 867 | 5/1970 |
| FR | 2 576 140 | 7/1986 |

* cited by examiner

Primary Examiner—Lynne H. Browne
Assistant Examiner—Michael P. Ferguson
(74) Attorney, Agent, or Firm—Harness, Dickey & Pierce, P.L.C.

(57) ABSTRACT

A connecting apparatus is provided for connecting a number of components, in particular for connecting the enclosure parts of circuit breakers. It includes a connecting element which has a shaft which passes through through-openings which are aligned with one another in the connection of the components, having an insertion end and having a holding end opposite it. In order to achieve firstly centering and secondly a turning or twisting distance which is as short as possible when the connecting element is twisted in order to brace the components, a first mounting depression, which holds the holding end and is aligned with the through-openings, as a centering cone, with the holding end being conical, forms a mating surface which corresponds with the centering cone.

8 Claims, 9 Drawing Sheets

LINKING DEVICE FOR COMPONENTS, ESPECIALLY FOR HOUSING PARTS OF CIRCUIT BREAKERS

This application is the national phase under 35 U.S.C. §371 of PCT International Application No. PCT/DE00/01200 which has an International filing date of Apr. 17, 2000, which designated the United States of America, the entire contents of which are hereby incorporated by reference.

FIELD OF THE INVENTION

The invention generally relates to a connecting apparatus including a first component and a second component, as well as a connecting element. Preferably, the components include enclosure parts or shells of switching devices which are installed in a row or low-voltage switching devices, for example of circuit breakers.

BACKGROUND OF THE INVENTION

Circuit breakers and other devices which are installed in a row, as well as their enclosure parts or halves, are normally connected via one or more poles by nuts and bolts, clips or brackets, or rivets. One enclosure shell and one cover shell typically have to be connected to one another for each pole. It is intended to be possible firstly to produce such connections cost-effectively and simply, such that they can be installed easily. Secondly, compression loads which occur as a consequence of arching influences are intended to be absorbed by the connections, and tolerances are intended to be compensated for, while allowing the enclosure shells to expand and ring when subjected to environmental conditions. A specific prestressing force is also intended to be exerted on the enclosure shells in order not only to ensure that the parts to be connected are protected against twisting, but also to ensure that the connection is protected against being inadvertently loosened.

While the use of a screw connection for connecting the components or enclosure shells to one another is, firstly, costly and, secondly, the screw connection must be secured against inadvertently becoming loose, for example by using varnish, a riveted joint offers only a small amount of compensation for tolerances in its longitudinal direction.

This is particularly true when the tolerances to be compensated for are additive. Furthermore, riveted joints easily bend when carrying out a riveting process using relatively long rivets. In addition, additional centering pieces have frequently been used in the past to protect the individual poles against twisting, even though this results in additional manufacturing and production costs.

At least two clips or brackets must be used, in a likewise costly manner, for a clip or bracket joint, which is likewise frequently used. In this case, the poles are firstly braced with respect to one another with only a small clamping force while, secondly, the clips or brackets can easily become loose, resulting in the risk of manipulation. A bonded joint, which has likewise been used in the past, does not allow the individual components to be dismantled without destroying them and, furthermore, does not ensure that the components are adequately braced with respect to one another.

A connecting element which is manufactured from a flat strip material is known from German Utility Model DE 83 22 594 A1, and this can also be used for circuit breakers having an elongated shaft, whose two shaft ends are T-shaped by means of integrally formed tabs. In order to insert the known connecting elements into the mutually aligned through-openings or holes in the components to be connected, one of the shaft ends is slotted such that the T-shaped holding or fixing tabs can be interlaced in the direction of the shaft longitudinal axis. This admittedly results in this shaft end being matched to the shaft width. However, this configuration necessarily leads to the cross section of the shaft, and hence the connecting element, being weakened, with the consequence that the cross section must be deliberately weakened over the entire shaft length by equidistant holes. Admittedly, it makes it possible to achieve a uniform material load and to avoid any weak point. However, this weakening of the cross section leads to a considerable reduction in the shaft cross section that can be loaded and hence to a reduction in the bracing force which is intended to be achieved by twisting the shaft, resulting in the length of the connecting element being reduced. Furthermore, during the twisting process, the entire slot, which is lengthened by means of an elongated hole, must be covered by a tool at the corresponding shaft end, and the opposite shaft end must be held in order firstly to secure this shaft end against rotation at the same time and, secondly, in order to achieve a tensile force, and hence a bracing force, which is as uniform as possible at the shaft ends. Furthermore, the complicated bending-in and bending-out mechanism with the slotted shaft end means that a number of twisting operations are required in order to ensure that the length of the connecting element is reduced sufficiently to brace the components.

SUMMARY OF THE INVENTION

The invention is thus based on an object of specifying a connecting apparatus of the type mentioned initially in which the disadvantages are avoided.

According to the invention, an object is achieved by the features of claim 1. To this end, a first mounting depression, which holds the holding end and is aligned with the through-openings, has a centering cone, the holding end-being conical, forming a mating surface which corresponds with the centering cone.

In consequence, the process of twisting the connecting element in order to brace the components firstly results in centering and secondly in a particularly short turning or twisting distance, without the material cross section being weakened along the shaft at the same time. Furthermore, in addition to reliable self-centering of the connecting element, which is preferably manufactured by stamping from a flat strip material, within the mutually aligned through-holes in the components, a tensile force which is uniform across the cross section of the connecting element is exerted on the opposite shaft end when a connecting element is twisted. In this case, this shaft end, which is also used as an insertion end, is inserted in a positively locking manner in a corresponding (second) mounting depression in the mounting state and before the connecting element is twisted.

In order to produce the positive lock for that shaft end which is opposite the conical holding end and is also used as the insertion end, it may be T-shaped with two fixing lugs. In this embodiment, diametrically opposite guide slots are provided in the through-openings in the components, in which guide slots the insertion end, and hence the two fixing lugs, are guided while the connecting element is being pushed through the through-openings.

In one particularly advantageous refinement, the connection in this variant is in the form of a bayonet fitting. To this end, when the connecting element is twisted, both fixing lugs are preferably guided at the insertion end along a respective ramp-like internal contour, which is provided in the (second) mounting depression, which holds the insertion end. In the process, the connecting element is preferably latched at the end of the twisting process and is thus fixed securely and detachably while exerting the desired bracing force. The ramp-like internal contour preferably has a number of recesses corresponding to the number of fixing lugs at the ramp end, into which recesses the fixing lugs are latched. In order to increase the bracing force further when the connecting element is in this fixing position, the shaft can also be twisted, so that its length is shortened. However, only a short torsional movement is then advantageously required for this purpose, with a half-twist or single twist. The ramp-like internal contour preferably extends over an angle of between 90° and 180° for each fixing lug, with the internal contour corresponding to a corresponding ramp circular segment.

In one alternative embodiment, the fixing lugs at the T-shaped insertion end are first of all bent inwards in the form of a circular arc, in an initial state, in order to match the external dimensions of the shaft. In the mounting state, that is to say once the connecting element has been inserted into the through-openings, the bent-in fixing lugs are bent radially outward. In order to allow the fixing lugs at the insertion end to be bent out outside the component or enclosure part facing them, in this case, the (first) mounting depression, which holds the opposite holding end of the connecting element, is designed to have two steps. The stepped internal contour is expediently formed by two notches, which run at an angle to one another, preferably at right angles, with different notch depths.

When the holding end of the connecting element is being fixed in position, the insertion end, which is provided with the fixing lugs, projects out of the mounting depression in a first comparatively deep position, and projects beyond the component or enclosure arrangement, so that the fixing lugs can be bent out radially in a simple manner. Following this bending process, the connecting element is pulled back and is fixed in a second position, which is displaced or offset axially outward with respect to the first position. In this case, the insertion end is at the same time pulled completely into this mounting depression that is associated with it.

The desired bracing force to brace the components or enclosure parts to one another is then produced by twisting the shaft of the connecting element. This is done by attaching an appropriate twisting tool to the insertion end, which is provided with the bent-out fixing lugs, with the centering effect on the holding end, which is opposite the insertion end, resulting in a more uniform tensile force being exerted on the connecting element. Furthermore, the comparatively large mating surfaces of the centering cone, which correspond with one another, on the one hand, and the centering cone at the holding end, on the other hand, advantageously result in the production of a friction force which is sufficient to avoid the holding end being rotated at the same time. There is thus no need to hold the connecting element firmly on both sides, at its two shaft ends. This embodiment is particularly suitable for connecting multipole circuit breakers having a corresponding number of enclosure and cover shells.

In another expedient refinement, the insertion end of the connecting element is designed like a fork, with two fixing lugs, which extend in the shaft longitudinal direction in an initial state, expediently being formed by an appropriate stamped-out area at the shaft end. The fixing lugs thus form a direct, straight-line extension of the shaft, without any projection at the sides. In the mounting state, these fixing lugs are bent out radially, and in this case the outward bend can be produced in the shaft plane, or transversely with respect to it.

In this embodiment, the connecting element is once again twisted by bending the fixing lugs out once the positive lock has been produced. In this case, the positive lock in the mounting state once again means that the number of turns that need to be made when twisting the shaft is particularly low, and, in particular, is just one turn.

The advantages achieved by the invention are, in particular, that the formation of a centering cone in a mounting depression which holds a conical holding end of a flat-strip-like connecting element firstly ensures centering and secondly ensures a high friction force, so that a high stress force is achieved, with simple handling at the same time, when the components provided with corresponding through-openings are braced. Furthermore, when the connecting element is being twisted in order to brace the components, a particularly short turning or twisting distance is achieved, with the connecting element being self-centered at the same time. Furthermore, in this case, only one connecting part is required, even for multipole devices, with a corresponding number of enclosure parts or shells for each such connecting point.

The connecting element provided for this purpose is, firstly, particularly simple and, secondly, is particularly robust since the material or shaft cross section is not weakened. The connection can also be made in situ in a particularly simple manner. When using galvanized steel strip or stainless material, this furthermore results in reliable corrosion protection. One major advantage is that it is possible to use already existing rivet holes or bolt holes in the enclosure parts. Since the positive lock, both at the holding end and at the insertion end of the shaft of the connecting element, is actually produced in the mounting state and before the turning and/or twisting of the connecting element, the reduction in the length of the connecting element required to apply the necessary bracing force, and hence the required torsional movement, are particularly short. In particular, they are considerably shorter than in the case of the cited prior art according to DE 83 22 594 U1.

BRIEF DESCRIPTION OF THE DRAWINGS

Exemplary embodiments of the invention will be explained in more detail in the following text with reference to a drawing, in which.

Mutually corresponding parts are provided with the same reference symbols in all the figures.

DETAILED DESCRIPTION OF THE PREFERRED EMBODIMENTS

Figure 1:
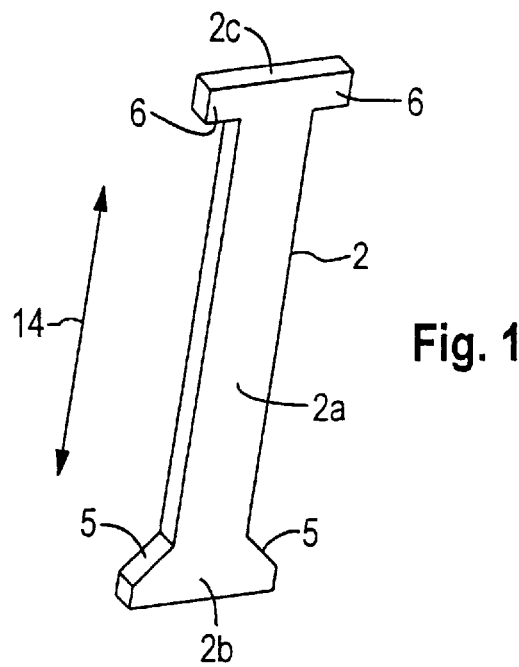
FIG. 1 shows a perspective illustration of an I-shaped connecting element in the form of a flat strip.
Figure 3:
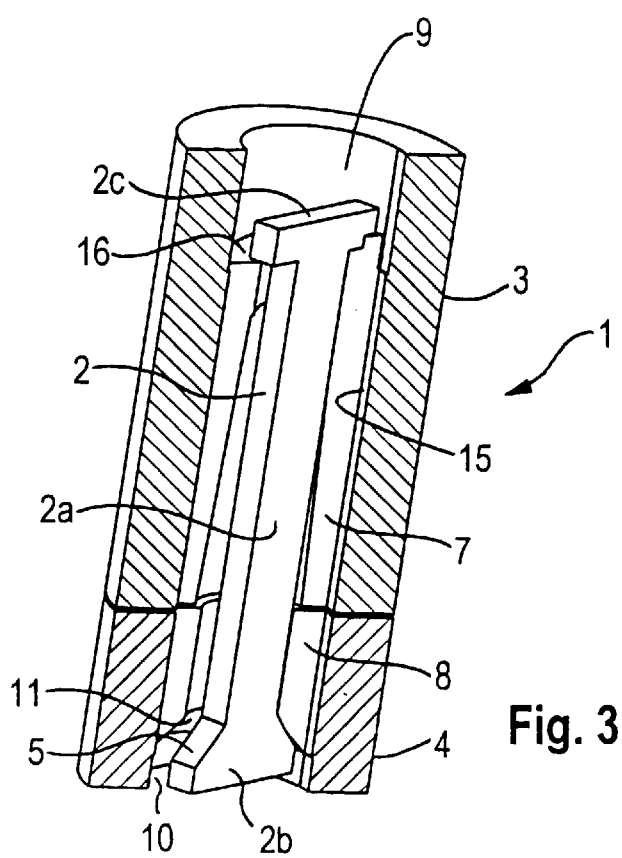
Figure 4:
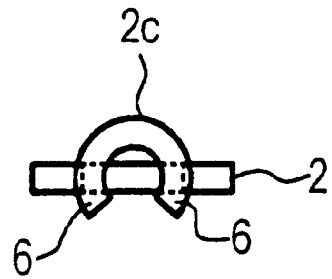
FIG. 4 shows a plan view (upper half of the figure) and a side view (lower half of the figure) of a connecting element as shown in FIG. 1, with fixing lugs, bent in a circular shape, at the insertion end, Figures each show, in the form of a plan view (upper 5 to 8 half of the figure) and in the form of a longitudinal section (lower half of the figure), the connecting element as shown in FIG. 4, in different mounting states of the connecting apparatus, with FIGS. 7 and 8 showing a longitudinal section offset through 90° with respect to FIGS. 5 and 6.
Figure 4:
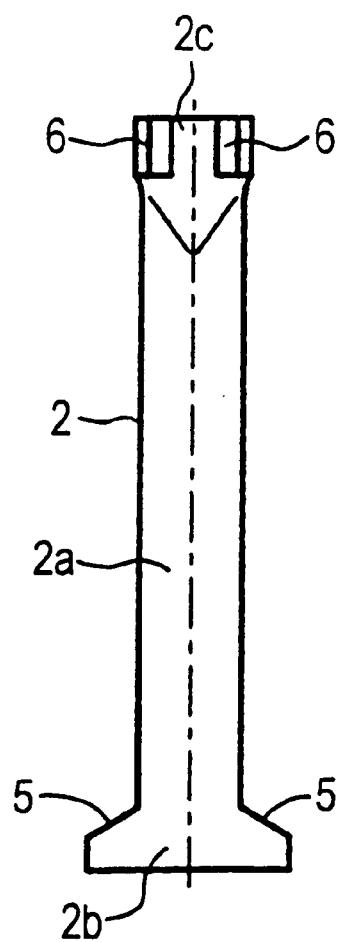

FIG. 1 shows an I-shaped connecting element 2, stamped from a flat strip material, of a connecting apparatus 1 as shown in FIG. 3 for connecting an enclosure shell 3 and a cover shell 4, for example of a circuit breaker. The connecting element 2 has an elongated shaft 2a, whose shaft ends 2b and 2c are extended radially outward. In this case, the shaft end 2b, which is referred to as the holding end in the following text, is conical, with the cone facing toward the shaft 2, forming mating surfaces 5. The opposite shaft end 2c, which is referred to as in the insertion end in the following text, has two fixing lugs or elements 6 which point radially outward.

Figure 2:
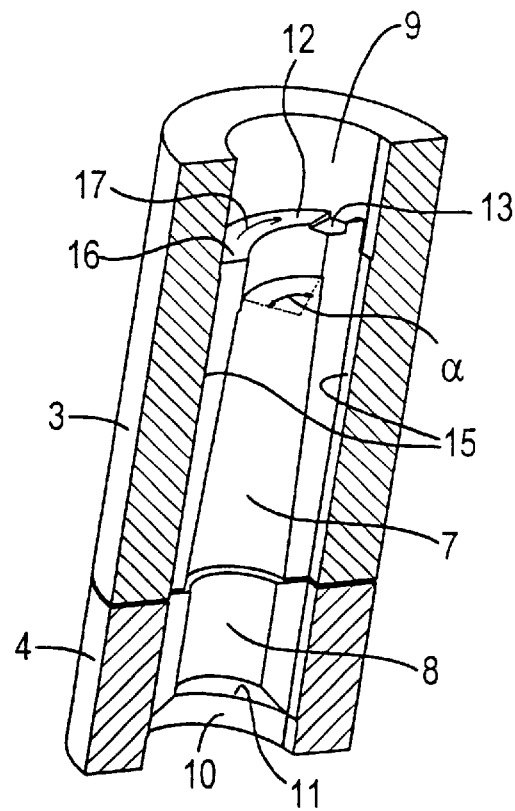
FIG. 2 shows, in a schematic perspective illustration sectioned in the longitudinal direction, the connecting area of two components for holding the connecting element as shown in FIG. 1, FIG. 3 uses an illustration corresponding to FIG. 2 to show the connecting apparatus with the connecting element inserted.

As can be seen comparatively clearly in FIG. 2, the components or enclosure parts 3, 4 are provided with mutually aligned through-openings 7 and 8, respectively, into which a respective mounting depression 9 or 10 opens. The first mounting depression 10, which is associated with the cover shell 4 in the exemplary embodiment, is provided with a centering cone 11, which corresponds to the mating surfaces 5 on the conical holding end 2b of the connecting element 1 and whose internal diameter tapers conically to the internal diameter of the through-holes 7, 8. The opposite, second mounting depression 9, which is associated with the enclosure shell 3 in the exemplary embodiment, has ramp-like internal contours 12 running in its circumferential direction, only one of which can be seen. These have a recess 13 at the end of the circular segment formed by them.

The through-openings 7, 8 are provided with diametrically opposite slots 15 in the shaft longitudinal direction 14 for guiding the fixing lugs 6 on the connecting element 1. The insertion end 2c of the connecting element 2 is inserted via these guide slots 15 until the fixing lugs 6 project beyond the respective ramp start 16. The enclosure parts 3, 4 are braced with respect to one another by subsequently twisting the connecting element 1 through a twisting angle α of approximately 100° to 180° in the twisting direction 17. In the process, the connecting element 2 latches into the corresponding recess 13 of the respective ramp end by the fixing lugs 6, which are guided along the ramp-like internal contours 12, snapping in. The bracing force achieved in the process can be increased by additional twisting or torquing of the shaft 2, with an appropriate twisting tool preferably acting either on the holding end 2b or on the insertion end 2c of the connecting element 1 for this purpose.

Figure 5:
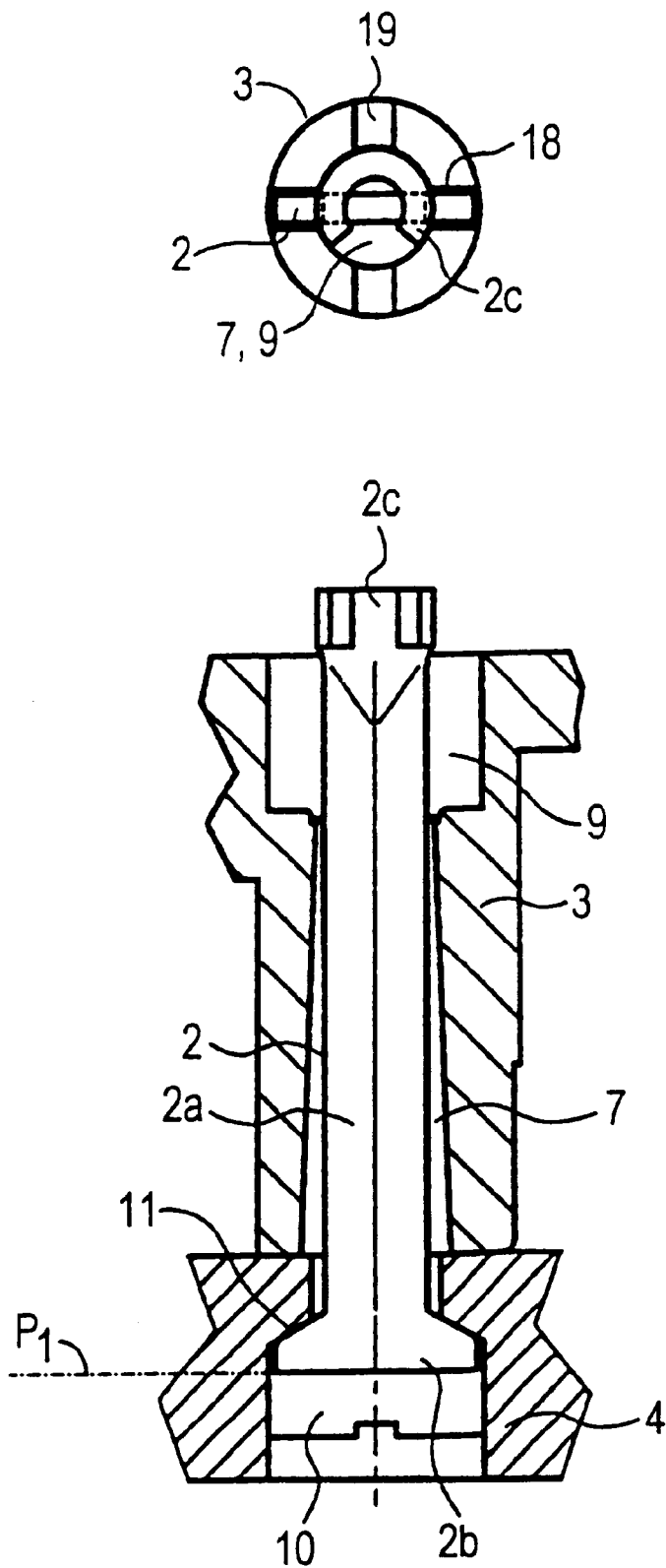

In the embodiment of the connecting apparatus 1 illustrated in FIGS. 4 to 8, the connecting element 2 is reduced, starting from its shape as shown in FIG. 1 at the insertion end 2c opposite the holding end 2b, by a bending process to the external size of the shaft 2, by the two fixing lugs 6 being bent in the form of a circle or circular arc. In this initial state, the connecting element 2 can be pushed through the mutually aligned through-holes 7, 8 in the enclosure parts 3 and 4, respectively. This mounting state is shown in FIG. 5 in the form of a longitudinal section (lower half of the figure) and in a plan view of the insertion end 2c (upper half of the figure). In this mounting state, the holding end 2b of the connecting element 1 is located in a first, comparatively deep, position $P_1$ within the mounting depression 10. The mounting depression 10 is appropriately stepped for this purpose, with two depressions or notches 18, 19, which run radially and at right angles to one another, being provided to form the steps. This can be seen in the upper halves of the figures in FIGS. 5 to 8.

Figure 6:
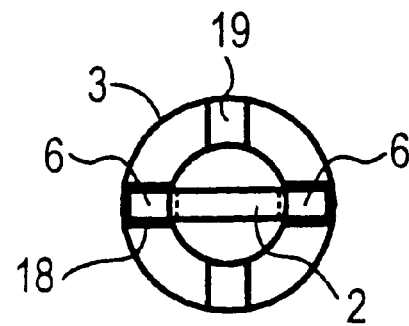
Figure 6:
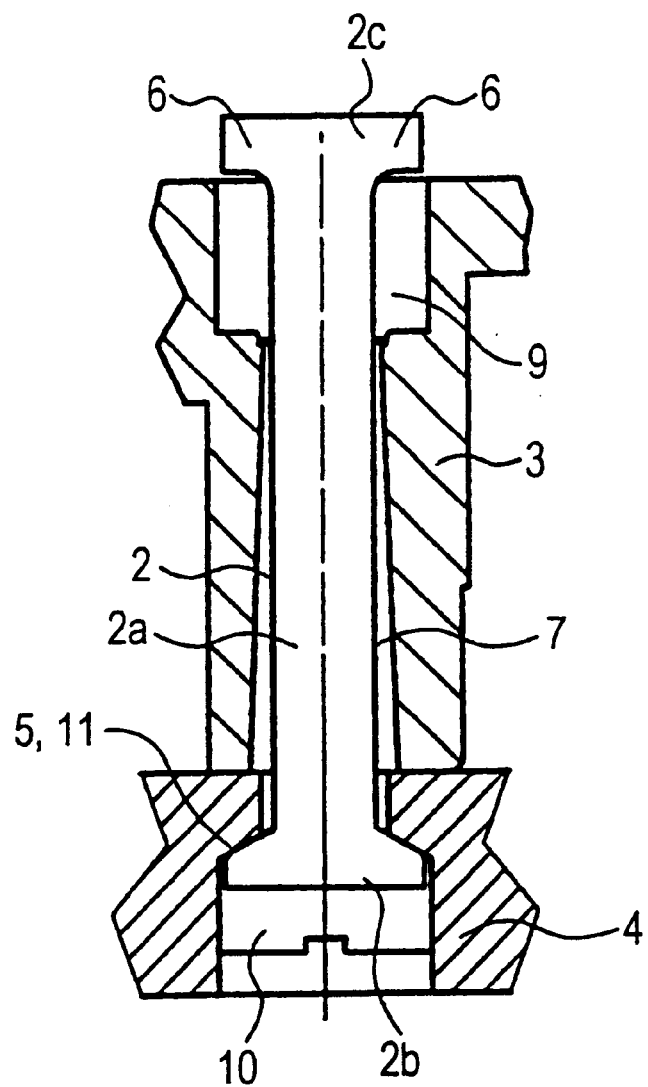
Figure 7:
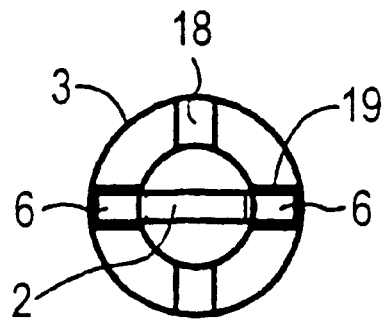
Figure 7:
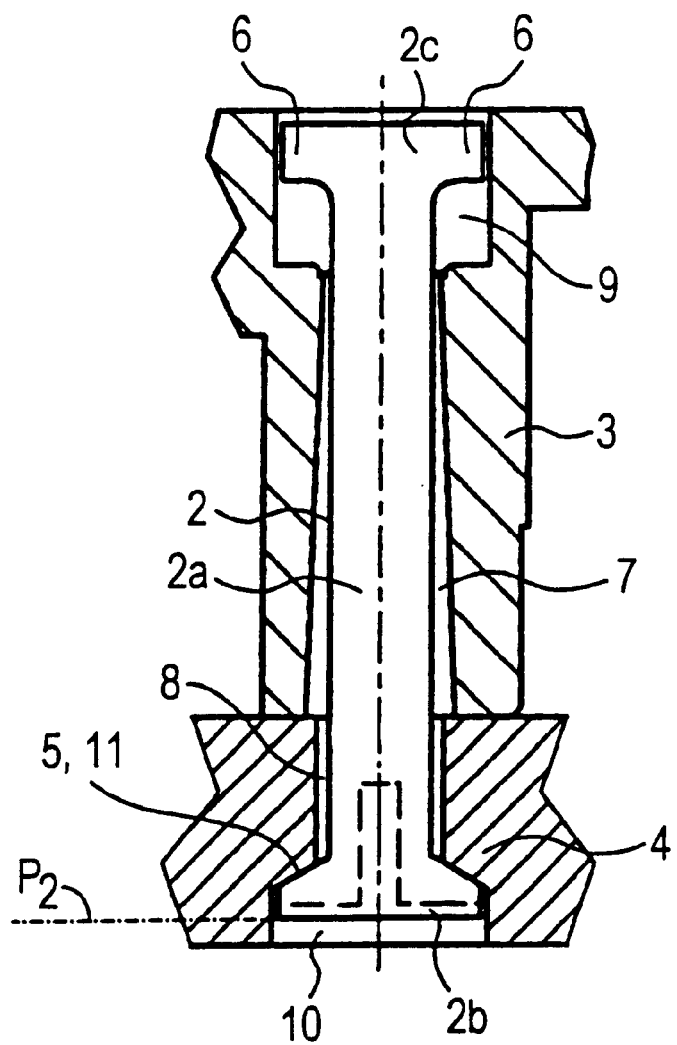

In a next mounting step, as shown in FIG. 6, the two fixing lugs 6 at the insertion end 2c of the connecting element 2 are bent radially outward, in which case the bending-out process can be carried out outside the enclosure part 3, since the conical holding end 2b is in a deep position. In a subsequent mounting step as shown in FIG. 7, the connecting element 2 is twisted through about 90° with respect to the position shown in FIGS. 5 and 6, with the conical holding end 2b being fixed in a second position $P_2$, which is offset axially outward. In this mounting state, both shaft ends 2b and 2c are completely inserted within the mounting depressions 9 and 10 respectively associated with them. In this case, the mating surfaces 5 on the conical holding end 2b are already located on the corresponding conical surfaces of the centering cone 11 within the mounting depression 10.

Figure 8:
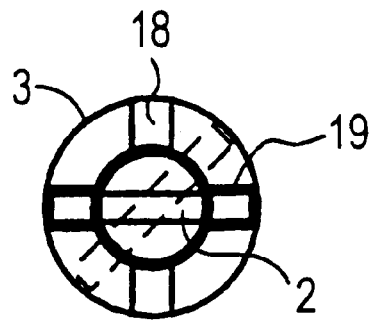
Figure 8:
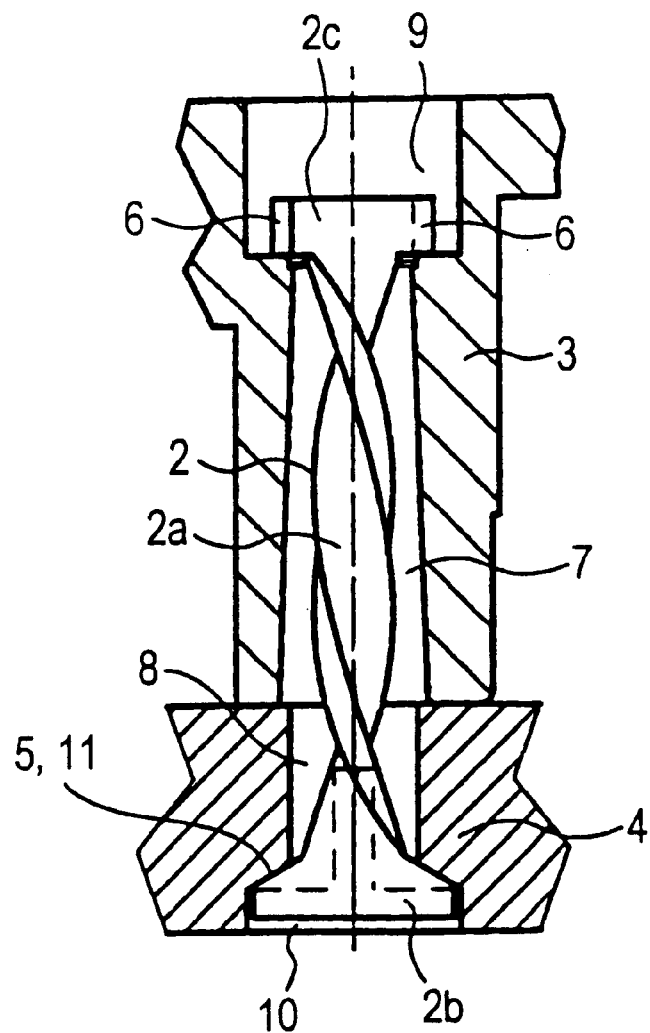

In a final mounting step, the shaft 2 of the connecting element 2 is twisted. This is done by using an appropriate tool (not illustrated) to act only on the insertion end 2c in order to twist the connecting element 2, during which process the opposite holding end 2b need not be held firmly owing to the friction fit between the mating surface 5 of the conical holding end 2b and the opposite surface, which corresponds with it, on the centering cone 11. This state, in which the two enclosure parts 3 and 4 are braced with respect to one another, is illustrated in FIG. 8. It can also be seen from this figure that only a single twisting turn, that is to say a 360° rotation of the insertion end 2c, is required to brace the enclosure parts 3, 4.

Figure 9:
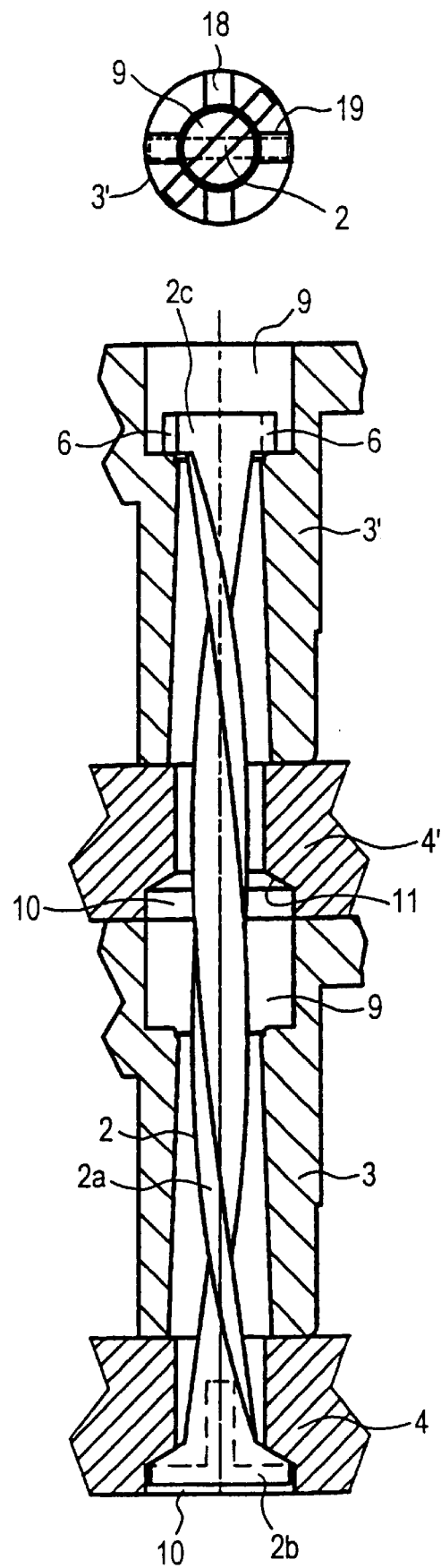
FIG. 9 shows two views of the connecting apparatus as shown in FIG. 8, for a two-pole device.

FIG. 9 shows a corresponding embodiment of the connection of a two-pole appliance with enclosure parts 3, 4 and 3', 4' located one above the other, illustrated as shown in FIG. 8. The connecting element 2 is approximately twice as long as the connecting element 2 for a single-pole enclosure, compared to the embodiment shown in FIGS. 5 to 8. In this case as well, the twisting process just involves rotating the insertion end 2c once through 360°.

Figure 10:
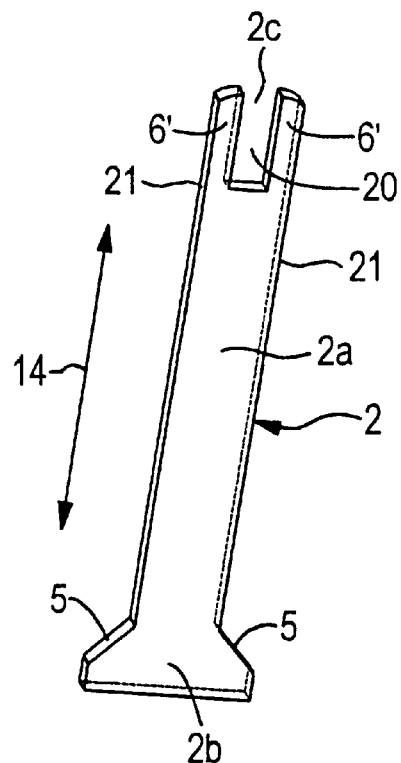
FIG. 10 shows a perspective illustration of an alternative embodiment of the connecting element with a fork-like insertion end.
Figure 11:
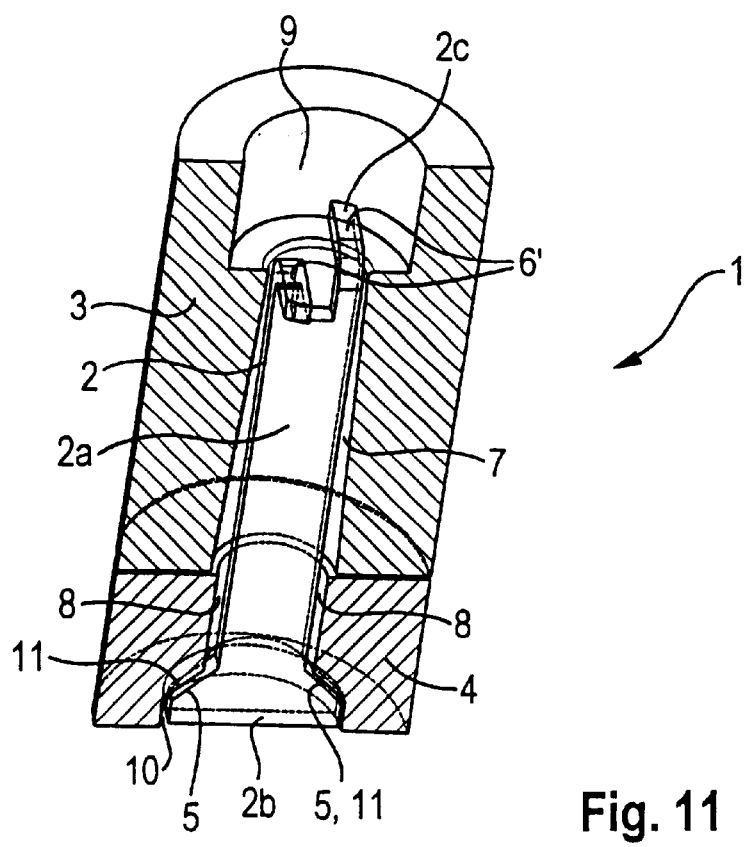
FIG. 11 shows a perspective illustration of the connecting apparatus with the connecting element as shown in FIG. 10.

FIG. 10 shows a further embodiment of the connecting element 2, whose mounting state is shown in FIG. 11. In this embodiment, the connecting element 2 is designed in the form of a fork by stamping at its insertion end 2c, and is provided with two fixing lugs 6', which extend in the shaft longitudinal direction 14 forming a rectangular slot 20. These fixing lugs 6' which extend like fingers parallel to one another in the shaft longitudinal direction 14, effectively form a direct extension of the shaft 2a, without the fixing lugs 6' projecting beyond the extent of the shaft 2a at the sides. In other words, the side outer edges 21 of the shaft 2a are directly aligned in the direction of the insertion end 2c, without any lateral projection, with the side outer edges of the fixing lugs 6'.

Once the connecting element 2 has been inserted through the mutually aligned through-holes 7, 8 in the respective enclosure parts 3 and 4 to be braced, the mating surfaces 5 of the conical holding end 2b once again form a friction fit on the corresponding opposite surface of the centering cone 11 within the mounting depression 10. The connecting element 2 is thus once again centered within the through-openings 7, 8. Bending the two fixing lugs 6' around in the opposite direction and transversely with respect to the plane of the shaft 2 itself results in the connecting element 2 being fixed in position in a positively locking manner within the mutually aligned through-holes 7, 8. The desired pulling-in force or bracing force is achieved by twisting the shaft 2 by means of the tool, which once again acts on only one end.

Figure 12:
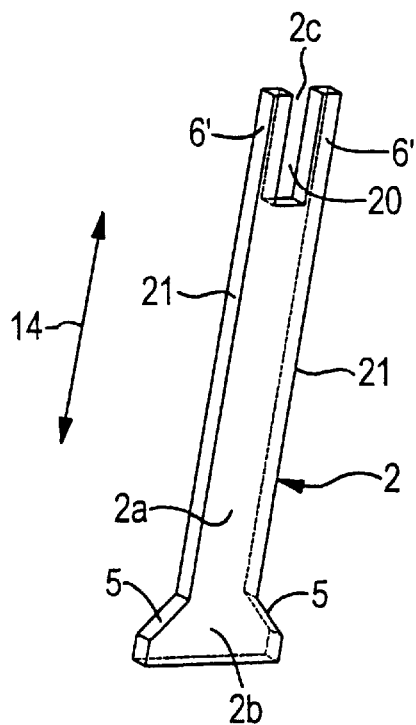
FIG. 12 shows a modified embodiment of the connecting element as shown in FIG. 10.
Figure 13:
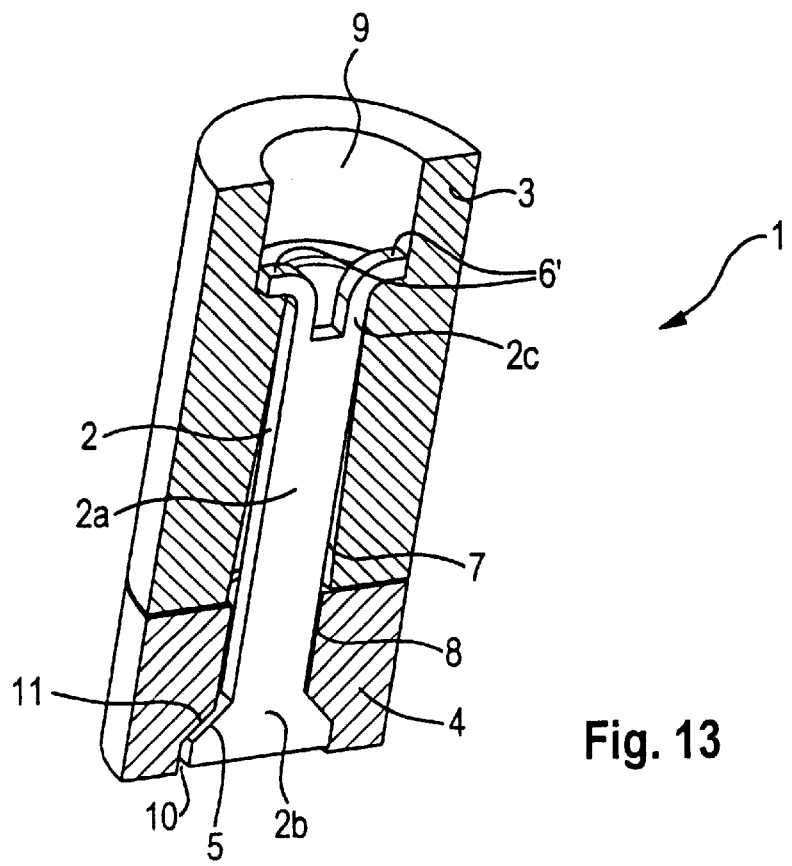
FIG. 13 shows a corresponding connecting apparatus, using the connecting element as shown in FIG. 12.

An alternative connecting apparatus 1 is shown in FIG. 13, in which the two fixing lugs 6', in contrast to the embodiment shown in FIG. 11, are bent radially outward in the opposite direction in the plane of the shaft 2. A connecting element 2 which is preferably used for this purpose is designed, as shown in FIG. 12, with flat ends on the fixing lugs 6', while these are rounded outward in the connecting element 2 shown in FIG. 10. A positive lock is once again produced here, with the necessary bracing force once again being produced by twisting at the opposite holding end 2b.

In comparison to the variant shown in FIG. 13, the connecting apparatus 1 as shown in FIG. 11 has the advantage that the fixing lugs 6' have a larger contact surface area. Furthermore, this results in a connection with particularly high elasticity. In addition, the connections as shown in FIGS. 11 and 13 are detachable, since rotation of the holding end 2b further results in the fixing lugs 6' being bent inward until the connecting element 2 can be pulled out of the through-holes 7, 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connecting apparatus comprising:
   a first component;
   a second component; and
   a connecting element including a shaft with an insertion end and with a holding end opposite the insertion end; wherein the shaft, in a connection, passes through mutually aligned through-openings in the first and second components; wherein twisting the connecting element braces the first and second components with respect to one another; and wherein a first mounting depression, aligned with the through-openings, in the second component, associated with the holding end, includes a centering cone; wherein the holding end is conical, forming a mating surface which corresponds with the centering cone; and wherein the insertion end is inserted into a second mounting depression in the first component, which is associated with the insertion end, when the connecting element is twisted; and wherein, at the insertion end, the connecting element includes two fixing lugs which are bent in the form of a circular arc, the axis of which is substantially parallel to the main axis of the shaft, in an initial state and are bent out radially in a mounting state.

2. The connecting apparatus as claimed in claim 1, wherein the connecting element is in the form of a flat strip including no weak point over the entire shaft length.

3. The connecting apparatus as claimed in claim 1, wherein the first mounting depression includes a stepped internal contour which, as a consequence of the connecting element being twisted, holds the conical holding end within the first mounting depression in a second position, which is axially offset with respect to a first position.

4. The connecting apparatus as claimed in claim 3, wherein the stepped internal contour is formed by two notches which run at an angle to one another.

5. The connecting apparatus of claim 2 wherein the connecting element includes no holes or slots.

6. The connecting apparatus as claimed in claim 2, wherein the first mounting depression includes a stepped internal contour which, as a consequence of the connecting element being twisted, holds the conical holding end within the first mounting depression in a second position, which is axially offset with respect to a first position.

7. The connecting apparatus of claim 4 wherein the angle is a right angle.

8. The connecting apparatus as claimed in claim 6, wherein the stepped internal contour is formed by two notches which run at an angle to one another.

* * * * *